United States Patent [19]
Haniu et al.

[11] Patent Number: 5,499,502
[45] Date of Patent: Mar. 19, 1996

[54] SECONDARY AIR SUPPLYING SYSTEM HAVING A MOTOR-DRIVEN AIR PUMP

[75] Inventors: Yukio Haniu, Chita; Shinji Ishida, Chiryu; Michio Koshimizu, Toyohashi, all of Japan

[73] Assignee: Nippondenso Co., Ltd., Kariya, Japan

[21] Appl. No.: 408,708

[22] Filed: Mar. 22, 1995

[30] Foreign Application Priority Data

Nov. 2, 1994 [JP] Japan .................................. 6-269598

[51] Int. Cl.⁶ .................................................. F01N 3/22
[52] U.S. Cl. ........................................... 60/290; 60/308
[58] Field of Search ............................ 60/290, 289, 287, 60/307, 308

[56] References Cited

U.S. PATENT DOCUMENTS

| | | | |
|---|---|---|---|
| 4,180,975 | 1/1980 | Takagi et al. | 60/293 |
| 5,065,575 | 11/1991 | Cook et al. | 60/290 |
| 5,140,810 | 8/1992 | Kuroda | 60/276 |
| 5,444,978 | 8/1995 | Yoshizaki et al. | 60/276 |

FOREIGN PATENT DOCUMENTS

| | | |
|---|---|---|
| 55-37535 | 3/1980 | Japan . |
| 56-132316 | 10/1981 | Japan . |
| 64-1578 | 1/1989 | Japan . |
| 4219415 | 8/1992 | Japan . |
| 5209512 | 8/1993 | Japan . |

Primary Examiner—Ira S. Lazarus
Assistant Examiner—L. Heyman
Attorney, Agent, or Firm—Cushman, Darby & Cushman

[57] ABSTRACT

A motor-driven air pump operates when an engine is starting so that warming-up of an exhaust gas purifying catalyst may be expedited. The air pump has a low ventilation resistance to pass secondary air therethrough even when the pump is not driven by the motor. A high-response, low pressure-loss check valve is disposed in a passage connecting the catalyst in the exhaust gas passage and the air pump. When the engine is decelerating, the pump is not driven. However, the secondary air is introduced to the catalyst through the high-response, low pressure-loss check valve from the pump under the negative pressure caused by pulsation of the exhaust gas pressure. Thus, a bad smell from the catalyst may be prevented without increasing the size of the air pump and the motor.

19 Claims, 10 Drawing Sheets

12345

SECONDARY AIR SUPPLYING SYSTEM HAVING A MOTOR-DRIVEN AIR PUMP

CROSS REFERENCE TO RELATED APPLICATION

The present application is based on and claims priority from Japanese Patent Application Laid Open No. Hei 6-269598, filed Nov. 2, 1994, the content of which is incorporated herein by reference.

BACKGROUND OF THE INVENTION

1. Field of the Invention

The present invention relates to a motor-driven air pump system for supplying secondary air to an engine exhaust air passage to purify the exhaust gas of a vehicle engine, and the present invention particularly relates to an improvement in a check valve used in such a system.

2. Description of the Related Art

A motor driven air pump system for forcibly supplying secondary air into an engine exhaust air passage is known as shown in Japanese Patent Application Laid Open No. Hei 4-219415. Such a conventional motor-driven air pump system is constructed as shown in FIG. 3. In this Figure, reference numeral 1 designates an engine, 2 a suction passage, 3 an air filter, 4 a throttle valve disposed in suction passage 2, 5 a suction manifold branching off from suction passage 2, 6 a cylinder, 7 a combustion chamber, 8 an exhaust manifold, 9 a catalytic converter, and 10 a combined exhaust gas passage. Reference numeral 11 designates an air pump which comprises a motor unit 11a operating when it receives a control signal from an electronic control device (not shown) having a microprocessor and a pump unit 11b which compresses air sucked through an intake air passage 12 from a point downstream from air filter 3. A secondary air passage 14 is connected to the discharging side of pump unit 11b through a passage switching valve 13 having a structure to be explained later, secondary air passage 14 diverges to become secondary air branch passages 15, and the end of secondary branch passages 15 open to exhaust gas manifold 8. In each secondary air branch passage 15, a check valve 16, the structure of which is shown in FIG. 4 on a enlarged scale, is disposed to pass only the secondary air passing therethrough toward exhaust manifold 8 (from the left to the right in FIG. 4). In other words, in FIG. 4, which shows a conventional check valve 16 used in a conventional motor-driven air pump system, an approximately cylindrical valve housing 17 has a funnel-shaped inlet cylindrical portion 19 tightly secured thereto together with a disk partition plate 18, which is formed with a plurality of sector valve openings 20. A rubber valve disk 21 is secured to the center of partition plate 18 by a rivet 24 through a partspherical stopper 22 and a backup coil spring 23. Reference numeral 25 designates a bolt portion formed integral with the outlet opening of valve housing 17. The structure of a conventional passage switching valve 13 is shown in FIG. 5. On a valve housing 26, an inlet cylindrical portion 27 connected to the secondary air passage 14 and an outlet cylindrical portion 28 connected to the discharging side of the motor-driven air pump 11 are formed. A valve opening is formed at the end of outlet cylindrical portion 28. A valve hood 32 is secured together with a diaphragm 31 to the opening end of a valve chamber 30 formed in valve housing 26. As a result, a pressure control chamber 33 is formed at the upper portion of diaphragm 31 in valve hood 32. A valve disk 35 to which a rubber sealing member 34 is thermally bonded is secured at one side of diaphragm 31 to close valve opening 29, and a deep bottomed pressure plate 36 is secured at the other side of diaphragm 31 to a hole at their center by a rivet 37. Pressure plate 36 is provided with a rubber ring 40 since it may collide with the inner surface of valve hood 32 which functions as a stopper. A compression spring 38 seated on pressure plate 36 held in valve hood 32 biases diaphragm 31 and valve disk 35 to close valve opening 29. As shown in FIGS. 1 and 3, pressure control chamber 33 formed in valve hood 32 is connected to a vacuum switching valve (VSV) 42 through a control pressure inlet 39 and control pressure intake pipe 41. VSV 42 is of an electromagnetic type which has one port connected to the downstream portion (surge tank 44, for example) of throttle valve 4 through a vacuum intake pipe 43 and another port 45 open to the atmosphere. VSV 42 is controlled to switch on or off according to control signals generated by the aforementioned electronic control device (not shown) to supply either the vacuum or the air, as the control pressure, to control pressure chamber 33 of passage switching valve 13 through control pressure intake pipe 41.

Since the conventional motor-driven air pump is constructed as above, when engine 1 is made to start at a cold temperature, the electronic control device (not shown) drives VSV 42 to connect control pressure intake pipe 41 to vacuum intake pipe 43. Consequently, the pressure in control pressure chamber 33 of passage switching valve 13 decreases to a negative pressure as the vacuum at the downstream of throttle valve 4 in engine suction passage 2 is introduced, and diaphragm 31 is sucked to move against compression spring 38 so that valve disk 35 moves to open valve opening 29. At the same time the control device generates a control signal and energizes electric motor 11a of motor-driven air pump 11 to rotate pump unit 11b, which compresses the secondary air sucked therein from suction passage 12 to flow through the opened passage switching valve 13, secondary air passage 14 and secondary air branch passage 15, and to deform rubber valve disk 21 of check valve 16, thereby opening valve opening 20 and to permit the second air to flow into intake air manifold 8 of engine 1.

When engine 1 starts at a cold temperature and the secondary air is added to the exhaust gas flowing into catalytic converter 9, oxidization, or exothermic reaction, of HC and CO in the exhaust gas is expedited so that temperature of the catalyst of catalytic converter 9 rises sharply to activate the catalyst quickly, thereby to attaining complete purification of the exhaust gas. When warming-up of the catalytic converter 9 has been completed, the control device switches over VSV 42 to introduce atmospheric pressure through opening 45 into control pressure chamber 33 of passage switching valve 13 through control pressure intake pipe 41, so that valve disk 35 is biassed by compression spring 38 to close valve opening 29 and deenergize motor unit 11a of motor-driven air pump 11 to stop operation of pump unit 11b. As a result, the conventional motor driven air pump stops, and pump unit 11b becomes a simple secondary air passage to allow the secondary air therethrough.

Further, as the exhaust gas passes intermittently the exhaust gas passage right at the downstream of the exhaust valve such as at exhaust manifold 8, the exhaust gas pressure always pulsates, so that when engine 1 rotates slowly, there intermittently exists a momentary period in which the exhaust gas pressure becomes negative.

Another prior art system, in which a forcible secondary air supplying means such as a motor driven air pump is not used and a unpowered simple secondary air supplying system in which secondary air is introduced through a reed-type check valve is also well-known to the public.

In Japanese Patent Application Laid Open No. Hei 5-209512, there is disclosed still another secondary air supplying system for an engine which includes a control device for supplying secondary air of a quantity appropriate for a given to engine operating condition into an engine exhaust gas system. The system comprises a control unit in which a characteristic curve of a voltage applied to a motor is selected from a table previously stored in a memory to get the secondary air quantity appropriate for the engine operating condition where a control signal is generated based on the characteristic curve, and a driving unit for driving a DC motor of a motor-driven air pump according to the signal to make the current consumption of the DC motor correspond to the secondary air quantity designated by the signal. A reed valve is disposed at the downstream portion of the motor-driven air pump. In this prior art system, when the driving unit drives the DC motor of the motor driven air pump, the motor current is detected as a parameter and controlled responsive to the secondary air supplying quantity designated by the operation signal so that a desired control which is simpler and more precise than a control operation based on the motor rotational speed, particularly at the lower speed of the motor, may be provided.

The aforementioned conventional motor driven air pump system forcibly supplies the secondary air to the exhaust gas flowing through exhaust pipe 8 in order to expedite warming-up of catalytic converter 9 during cold starting of engine 1. However, that in the ordinary engine operation at such engine operating condition suitable to the object of exhaust gas purifying by introducing secondary air into the exhaust gas as the condition at the deceleration of engine 1 when throttle valve 4 is closed and HC and CO in the exhaust gas increases. In such a condition, passage switching valve 13, as in the warming-up of catalyzer 9, and the secondary air is supplied forcibly into exhaust manifold 8 by motor-driven air pump 11, thereby eliminating a bad smell of the catalyst generated by unburned gases such as HC and CO entering the catalytic converter 9 during deceleration. However, deceleration occurs frequently in the ordinary operation of engine 1 of a vehicle and if motor-driven air pump 11 is energized during each deceleration, the heat generation at motor unit 11 is so significant that the durability of motor driven air pump 11 is lowered. If motor driven air pump 11 is arranged to be durable and larger in size, the whole size of the system including motor-driven air pump 11 increases and the cost of the system is also unavoidably increased.

In such condition where secondary air supply is preferable, when motor-driven air pump 11 is made to stop and, at the same time, only passage switching valve 13 is made to open, check valve 16 opens during the negative pressure period caused by the exhaust gas pulsation. One may think that the secondary air may be introduced into the exhaust gas without power assistance under such circumstances.

However, check valve 16 of the conventional motor-driven air pump system employs rubber valve disk 21 to check the backflow of the exhaust gas and closes valve opening 20 by means of the rubber elasticity of valve disk 21 and the bias of coil spring 23, thus making the valve opening pressure high. Further, if the check valve 16 is opened during the momentary negative pressure period caused by the exhaust gas pulsation, the valve is not lifted enough the air flow resistance becomes high, and the pressure loss increases. Consequently, even when the momentary negative pressure caused by the pulsation of the exhaust gas pressure in exhaust manifold 8 is produced in valve housing 17 repeatedly, valve disk 21 may not follow the pulsation, and valve opening 20 cannot pass a sufficient amount of the secondary air therethrough.

In the conventional motor-driven air pump system, as shown in FIGS. 3–5, it is impossible to supply the secondary air without power assistance. If the secondary air supply was made by motor-driven air pump 11, it would be impossible to supply the secondary air during acceleration frequent supply is necessary, without a bigger motor-driven air pump 11. In the motor-driven air pump system shown in Japanese Patent Application Laid Open No. Hei 5-209512, since the motor driving electric current is used as the control parameter in order to control the discharge amount of the motor-driven air pump, it is necessary to control the motor according to an applied voltage characteristic curve.

SUMMARY OF THE PRESENT INVENTION

In view of above prior art systems, the present invention has an object to of providing a simple and compact secondary air supplying system which may be used not only for the warming-up of the engine but also for a bad smell from the catalytic converter by supplying a suitable amount of the secondary air under frequent operating conditions such deceleration of the engine.

Another object of the present invention is to provide a simple and compact secondary air supplying system which does not require a bigger motor-driven air pump.

Another object of the present invention is to provide a secondary air supplying system which may be manufactured at a reduced cost, and is very practical and remarkably easy to install.

A further object of the present invention is to provide a motor-driven secondary air supplying system which does not require complicated control of the motor-driven air pump.

A still further object of the present invention is to provide a secondary air supplying system which comprises an air pump having low ventilation resistance and a highly sensitive reed valve to pass secondary air from the air pump at a rate as high as 200 liter/minutes at a pressure of less than 4 kP.

Yet a further object of the present invention is to provide a secondary air supplying system which comprises an air pump and a valve unit in which a passage switching valve introducing the secondary air from the air pump to a catalytic converter and a reed valve disposed at the portion of the air pump are integrally combined.

A further object of the present invention is to provide a secondary air supplying system which comprises an air pump and a reed valve disposed at the portion of the air pump where the valve's reed member is made of thin metal foil.

When an engine starts, a motor-driven air pump is driven, and compressed secondary air is forcibly supplied through a secondary air passage to an engine exhaust air pipe, and warming-up of a catalyst is expedited. At this time, a control device makes a passage switching valve open and a low pressure-loss reed valve connected in series with the passage switching valve open wide due to the secondary air discharging pressure of the motor-driven air pump.

When the warming-up is completed and operation of the engine moves to ordinary operation, the motor-driven pump is deenergized and stops its rotation, but still, it allows the secondary air to pass therethrough. Even under such normal operation as deceleration of the vehicle, the control device makes the passage switching valve open when secondary air is required. Although the motor-driven air pump is not energized, since exhaust gas pressure in the suction passage pulsates, the low power-loss reed valve opens as a high performance check valve during the negative pressure period of the pulsation so that the secondary air may be automatically sucked into the exhaust passage. As a result, the secondary air is supplied to the exhaust passage without any power drive a bad smell of the catalyzer generated at engine deceleration may be eliminated.

BRIEF DESCRIPTION OF THE DRAWINGS

Other objects, features and characteristics of the present invention as well as the functions of the present invention of related parts will become clear from a study of the following detailed description, the appended claims and the drawings. In the accompanying drawings:

DETAILED DESCRIPTION OF THE PREFERRED EMBODIMENTS

Figure 1:
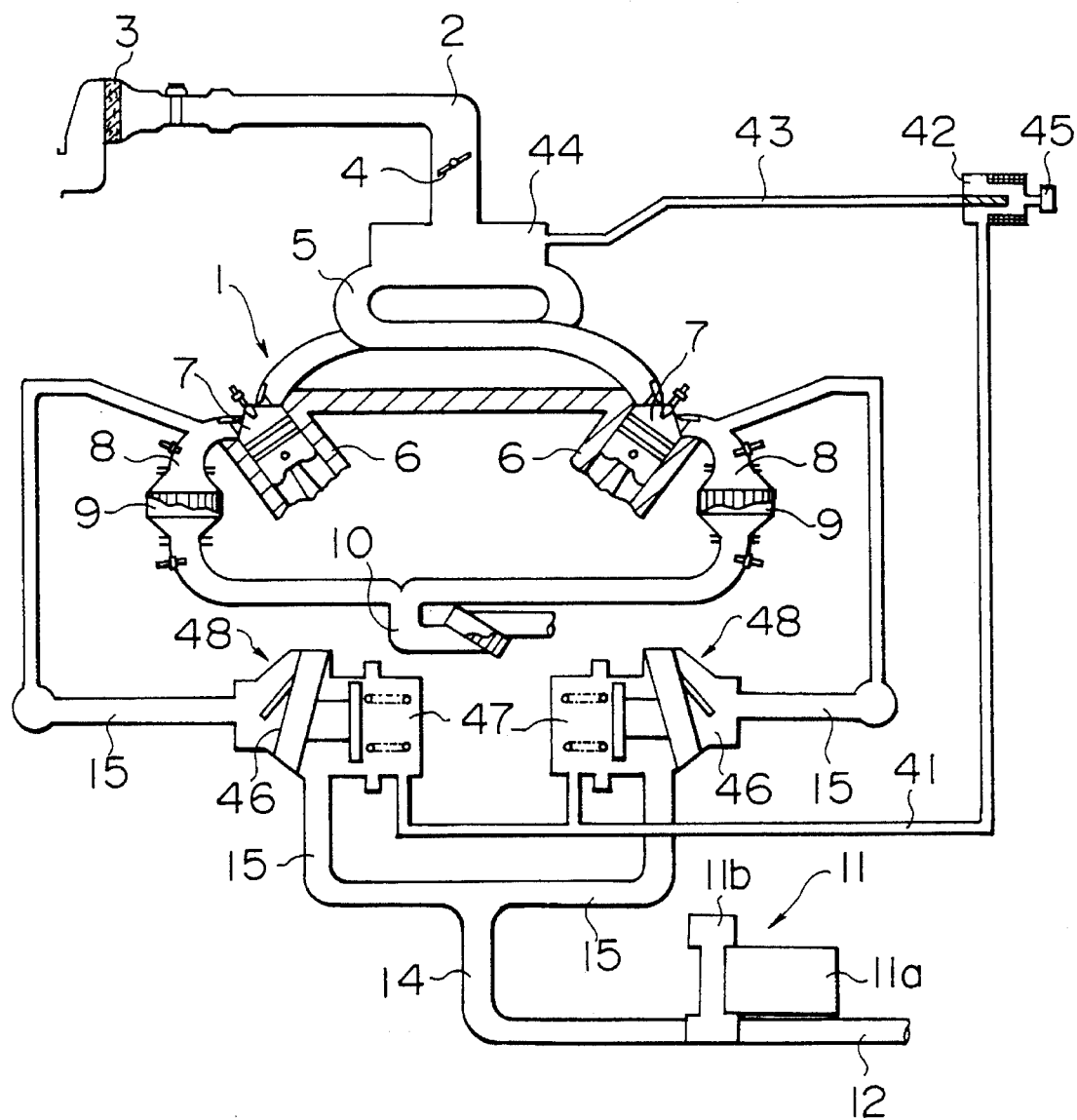
FIG. 1 is a cross-sectional view of a motor-driven air pump system according to a first preferred embodiment of the present invention.

The first preferred embodiment of a motor-driven air pump system of the present invention is explained with reference to FIG. 1. A portion or part which has been already shown in FIG. 3 or explained before has the same reference numerals thereon. That is, reference numeral 1 designates an engine, 2 a suction passage, 3 an air cleaner, 4 a throttle valve, 5 a branched intake manifold, 6 a cylinder, 7 a combustion chamber, 8 an exhaust manifold, 9 a catalytic converter, 10 a combined exhaust passage, 11 a motor-driven air pump, 11a a motor unit, 11b a pump unit, 12 a suction passage, 14 a secondary air passage, 15 a secondary air branch passage, 41 a control pressure intake pipe, 42 a vacuum switching valve (VSV), 43 a vacuum intake pipe, and 45 an air intake port.

Figure 2:
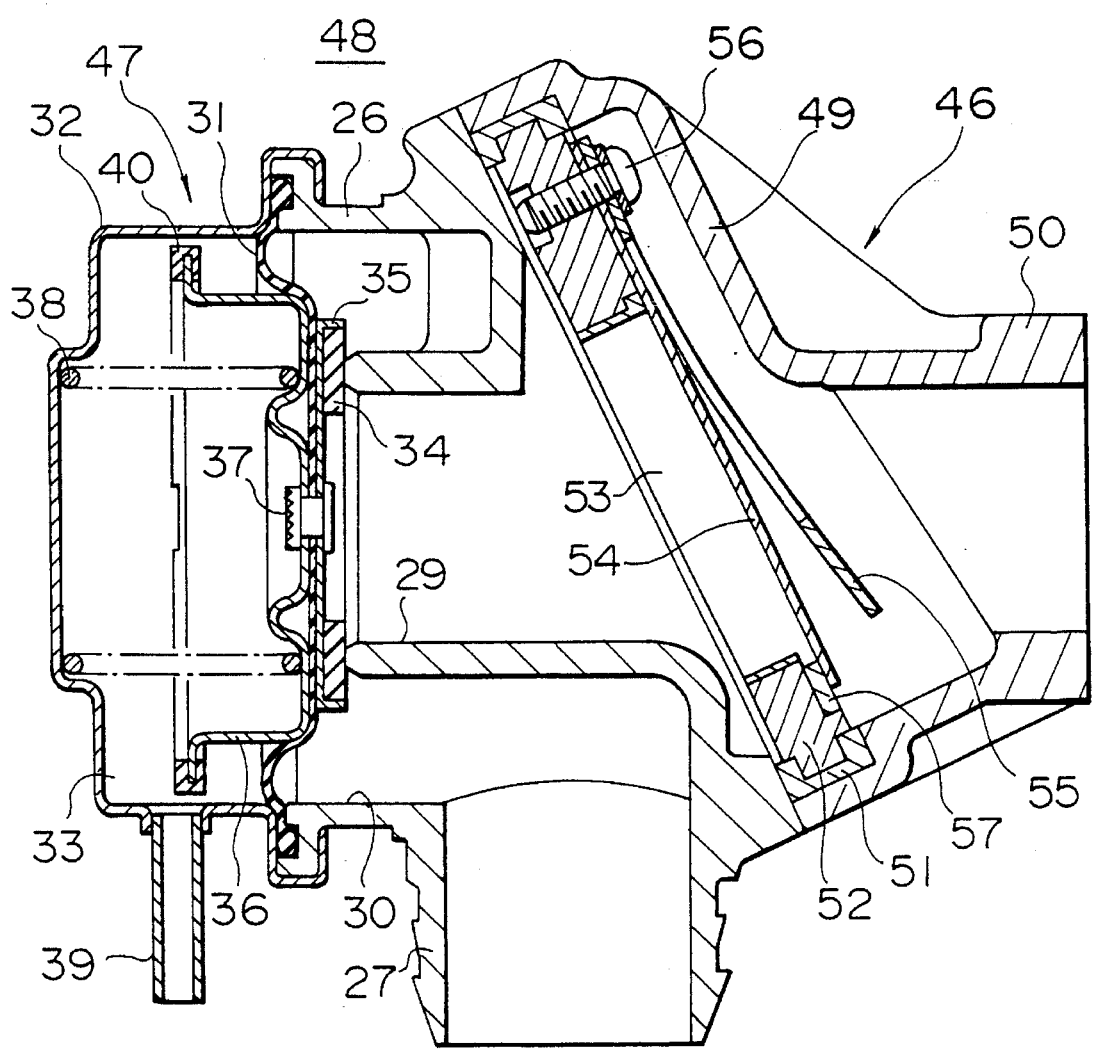
FIG. 2 is an enlarged cross-sectional view of the value unit shown in FIG. 1.

A valve unit 48 in which a low pressure-loss valve for use is a check valve and passage switching valve are combined as shown in detail in Fig.2. Reference numeral 26 designates a valve housing, 27 an inlet cylinder portion, 29 a valve opening, 30 a valve chamber, 31 a diaphragm, 32 a valve hood, 33 a control pressure chamber, 34 a sealing member, 35 a valve plate, 36 a pressure plate, 37 a rivet, 38 a compression spring, 39 a control pressure inlet, and 40 a buffer rubber ring. Valve housing 49 is integrally secured to valve housing 26 of a passage switching valve 47 by certain means which, although are not shown here, will be readily apparent to those skilled in the art. An outlet cylindrical portion 50 of valve housing 49 is connected to exhaust manifold 8, so that the secondary air may flow through secondary air branch passage 15 toward the upstream of catalytic converter 9. Low pressure-loss reed valve 46 shown in FIG. 2 has a plate 52 held in a sealing member 51 to block the opening of housing 49. Plate 52 is held between valve housing 26 of passage switching valve 47 and valve housing 49 of low pressure-loss reed valve 46 when both units are assembled. Plate 52 has a rectangular cross-section valve opening 53 formed therein and a rectangular valve reed 54 made of foil such at stainless steel foil or spring steel foil, is disposed to block valve opening 53. This reed valve is characterized by the above reed structure as a low pressure-loss valve. Valve reed 54 is secured to plate 52 by a bolt 56 with a stopper 55 to prevent excessive deformation of valve reed 54. In order to relieve a shock generated when valve reed 54 closes valve opening 53 and to enhance the reed's sealing function, a rubber buffer piece 57 is fitted to a portion around valve opening 53.

Next will be explained operation of the embodiment of the present invention with reference to FIGS. 1 and 2. In this embodiment, the motor-driven air pump 11 is used for a couple of objects, one of which is to expedite warming-up of the catalytic converter 9, and the other is to eliminate a bad smell from the catalytic converter 9. The former object to expedite activation of the catalyzer also an object of some prior art system. However, the latter object of eliminating a bad smell from the catalyzer 9 is specific to the present invention, and no prior art motor-driven air pump system can achieve this object without increasing the size of the motor-driven air pump.

Right after the engine is started, motor-driven air pump 11 is energized by a control signal generated by a control device (not shown), pump unit 11b is rotated and vacuum switching valve (VSV) 42 is switched over to connect vacuum intake pipe 43 to control pressure intake pipe 41, and the suction vacuum of surge tank 44 is supplied to control pressure chamber 33 of passage switching valve 47. As a result, valve plate 35 opens valve opening 29 against compression spring 38 and the secondary air compressed by motor driven air pump 11 flows through secondary air passage 14 and secondary air branch passage 15 into valve opening 53 of low pressure-loss valve 46, pushes valve reed 54 to open and further flows through outlet cylinder portion 50 into exhaust manifold 8. When the secondary air is supplied to the upstream of portion of catalytic converter 9, the temperature rise of the catalyst is expedited to reach an activation temperature for the catalytic converter 9 and achieve complete exhaust gas purification in short time. When the temperature of the catalyzer reaches the activation temperature, motor-driven air pump 1 stops in response to the control signal from the control device, and, at the same time, VSV 42 is switched over to introduce atmospheric air through control pressure intake valve 41 to control pressure chamber 33 of passage switching valve 47, so that valve plate 35 is biassed by compression spring 38 to close valve opening 29 and passage switching valve 47 closes secondary air branch passage 15. As a result, secondary air supply to exhaust manifold 8 is terminated.

When engine 1 comes into the deceleration during the ordinary operation, throttle valve 4 is closed and unburned gases as HC or CO in the exhaust gas increase and enter catalytic converter 9. In the system according to the first preferred embodiment, when the control device detects the deceleration of engine 1, it controls VSV 42 to introduce the suction vacuum of surge tank 44 into control pressure chamber 33 of passage switching valve 47. Consequently, passage switching valve 47 opens to connect secondary air passage 14 with the upstream portion of the catalytic converter 9 through secondary air branch passage 15. At this time, motor driven air pump 11 is not energized and only allows the secondary air to pass therethrough. However, as the exhaust gas pulsation increases, valve reed 54 of low pressure-loss valve 46 opens valve opening 53 each time the pressure of exhaust manifold 8 becomes negative, thereby to introducing the secondary air into exhaust manifold 8 intermittently. Since the motor driven air pump 11 is arranged to allow the secondary air to flow therethrough, the pump unit 11b is, preferably, of the centrifugal or the axial flow type rather than of the displacement type in order to get low ventilation resistance. Since the low pressure-loss reed valve using a reed of very thin stainless foil functions with excellent response characteristics and low pressure loss, it may supply a sufficient amount of the secondary air into exhaust manifold 8 solely as a result of the exhaust gas pulsation. Consequently, oxidization of the unburned gas is expedited and bad smell from the catalyzer may be eliminated. Even when the frequent deceleration of the engine takes place, motor-driven air pump 11 is not energized and motor unit 11a is not in danger of over-heating, and is only required to pass the secondary air therethrough during cold starting of the engine, thereby resulting in a small sized pump. As a result, such problems as space, cost and installation caused by the big conventional air pump 11 are not present in systems according to the present invention.

Figure 6:
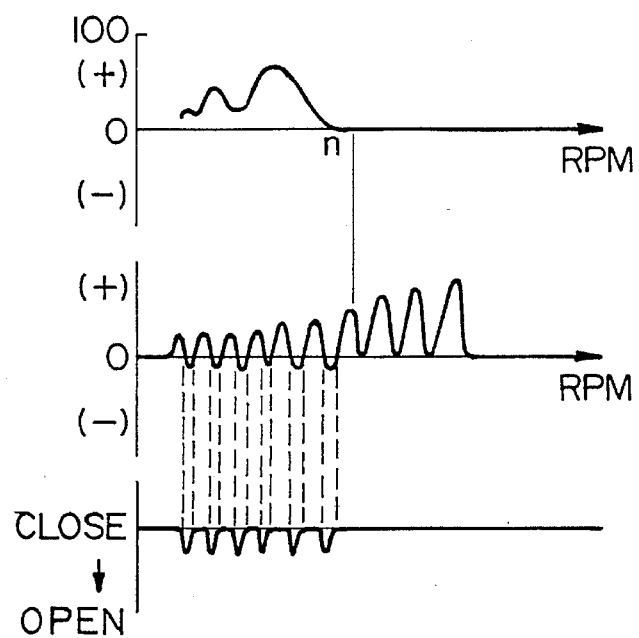
FIG. 6 is a graph showing the performance of the embodiment.

FIG. 6 is a graph showing operational characteristics of the motor-driven air pump 11 of the first preferred embodiment according to the present invention as shown in Fig.1 and FIG. 2. That is, the secondary air quantity, exhaust gas pressure and change in the valve lift of low pressure-loss reed valve 46 are shown on the vertical axis of graphs (A), (B) and (C) of FIG. 6 and the rotational speed of engine 1 is shown on the horizontal axis, while motor-driven air pump 11 is deenergized with passage switching valve 47 being opened under ordinary engine operating conditions. The exhaust gas pressure in exhaust manifold 8 pulsates as shown in graph (B) of FIG. 6. The pulsation of the exhaust gas pressure alternately becomes the negative or the positive when engine 1 rotates slowly up to a speed n. Since the first preferred embodiment according to the present invention uses a low pressure-loss reed valve 46 which responds to pressure changes with high sensitivity, it immediately closes to interrupt the exhaust gas flowing into the motor-driven pump 11 when the exhaust gas pressure is positive, and immediately opens to introduce the secondary air into exhaust manifold 8 when the exhaust gas pressure becomes negative, as shown in graph (C) of FIG. 6. Consequently, the secondary air quantity (liters/minute) of this embodiment can be obtained sufficiently as shown in graph (A) of FIG. 6.

Figure 7:
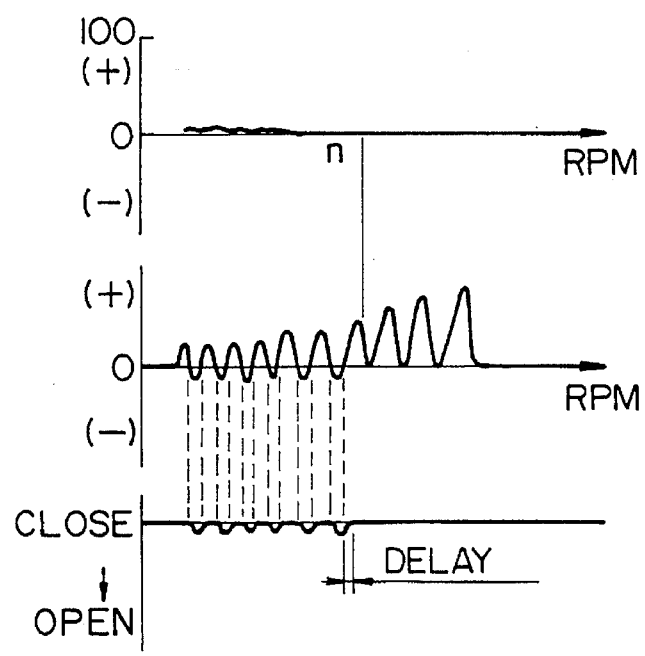
FIG. 7 is a comparative graph showing the operation of a art system.

FIG. 7 is a graph showing operational characteristic of the conventional motor-driven air pump system, in which the secondary air quantity, exhaust gas pressure and the valve lift change of check valve 16 are shown the vertical axis of graphs (A), (B) and (C) of FIG. 7, respectively change with the engine 1 rotational speed shown on the horizontal axis. Although the pulsation of the exhaust gas pressure in graph (B) of FIG. 7 is the same as that in graph (B) of FIG. 6, the check valve 16 using rubber valve plate 21 responds to the pressure pulsation so slowly that the negative pressure portion of the pulsation may not be effectively utilized. In other words, since the valve lift of check valve 16 during the negative pressure period in the pulsation is so small, and the pressure loss thereof is so large that the secondary air may not be supplied to the catalytic converter 9 sufficiently during engine deceleration.

Figure 8:
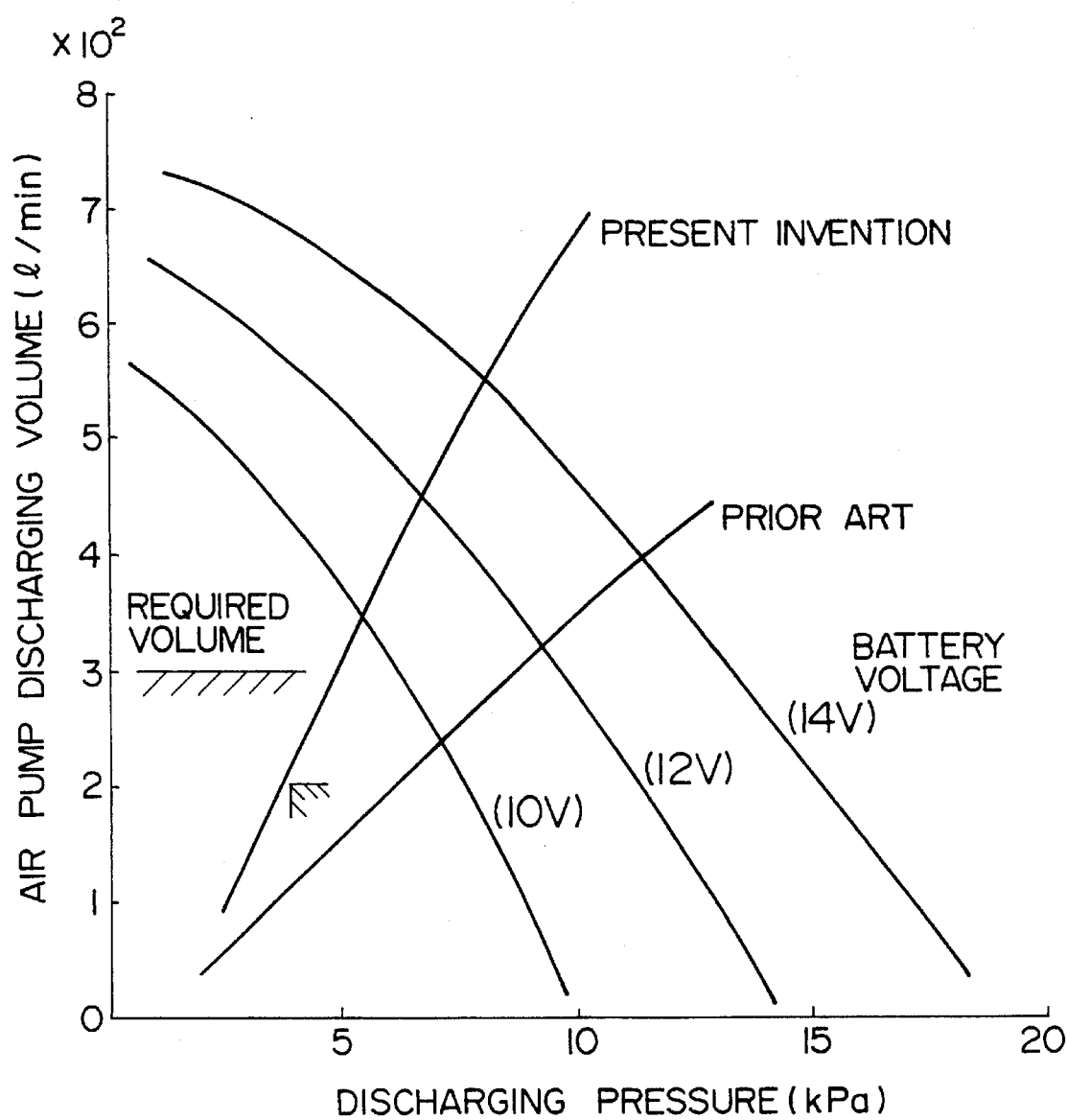
FIG. 8 is a graph showing characteristic curves of the motor-driven air pump of the embodiment.

FIG. 8 shows characteristic curves of motor-driven air pump 11 in which relationship between the discharging pressure and the discharging quantity of motor-driven air pump 11 (pump portion 11b) is shown. The prior art shown here corresponds to the motor-driven air pump system shown in Japanese Patent Publication Laid Open No. Hei 5-209512 in which a combination of the motor driven air pump and the reed valve is disclosed. In the prior art system, if the battery voltage lowers from 12 V to 10 V, the required discharging quantity of the motor-driven air pump (300 l/min) is not satisfied.

On the other hand, the motor-driven air pump according to the invention may satisfy the required discharging quantity, 300 l/min, even when the battery voltage drops to 10 V. Further, the low pressure-loss valve 46 of the motor-driven air pump system according to the present invention satisfies the discharging pressure which is less than 4 kPa when the discharging quantity is 200 l/min (that is, even when the discharging pressure of the motor-driven air pump becomes less than 4 kPa, the valve opening is wide enough to supply a sufficient quantity of the compressed air ).

Figure 9:
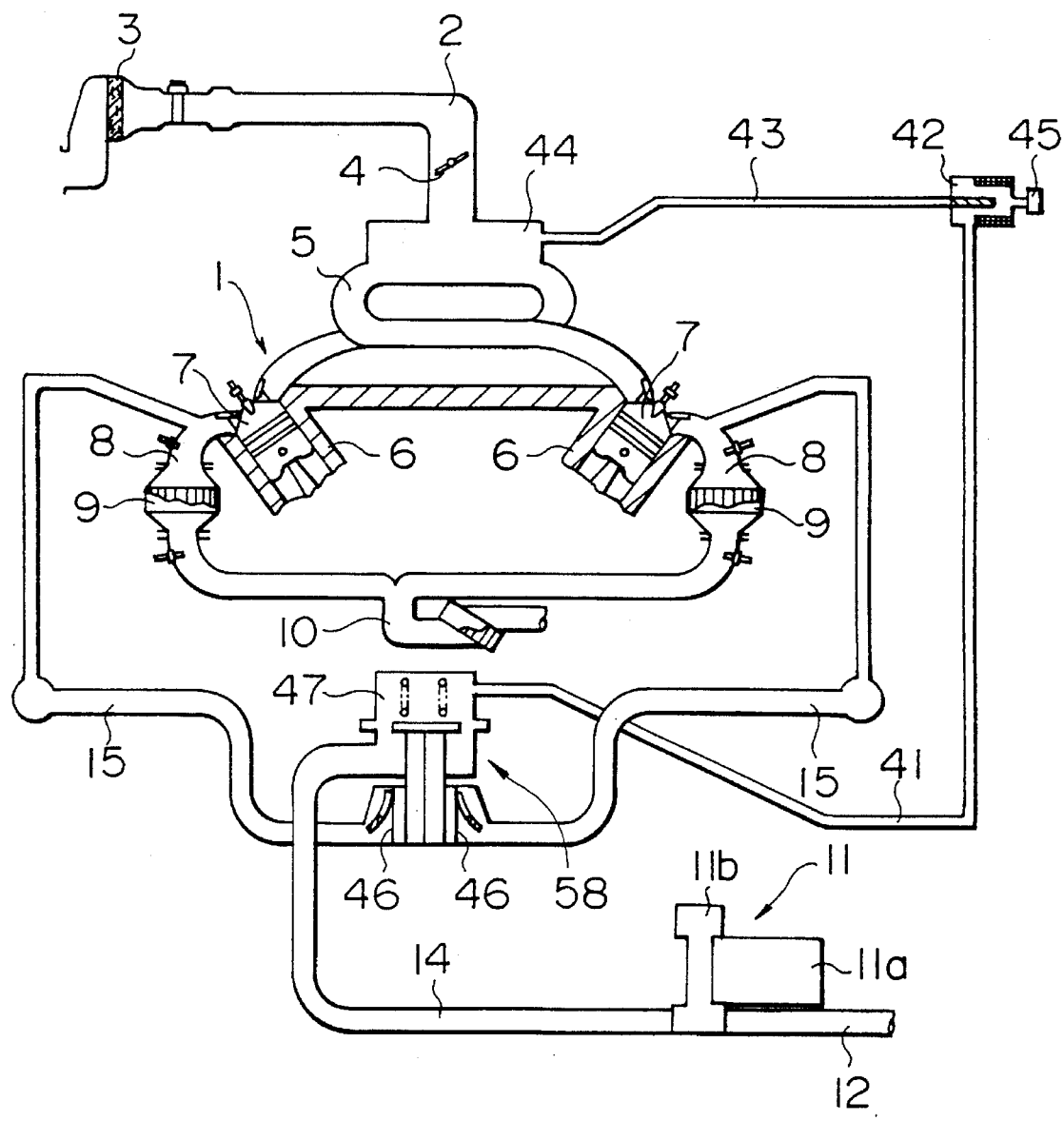
FIG. 9 is a cross-sectional view showing a motor driven air pump according to a second preferred embodiment of the present invention.
Figure 10:
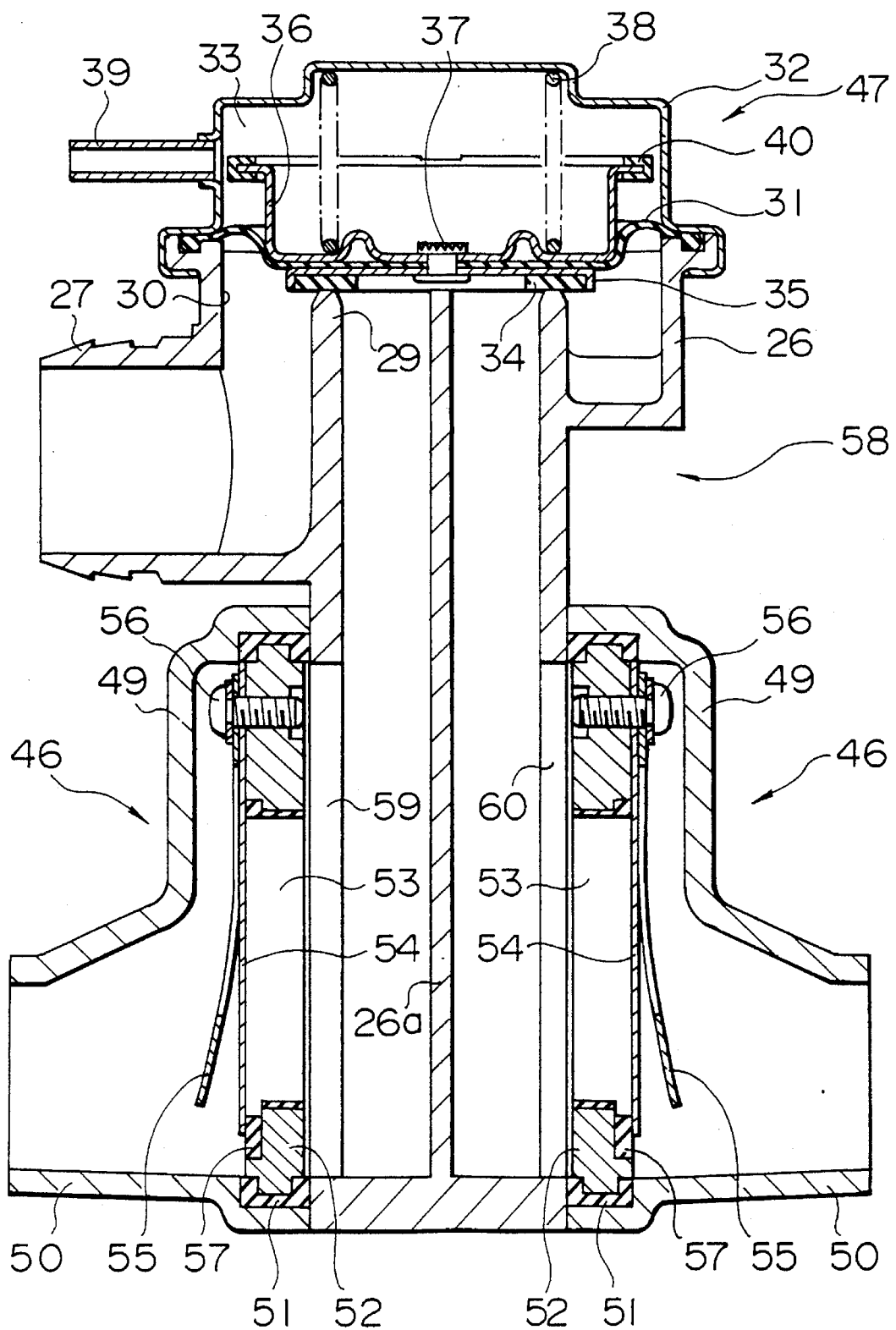
FIG. 10 is an enlarged cross sectional view of the valve unit shown in FIG. 9.

A second preferred embodiment of the motor-driven air pump system according to the present invention will be explained with reference to FIG. 9 and FIG. 10.

The parts or portions which are substantially the same or similar and have been explained before with reference to FIGS. 1 and 2 will have the same reference numerals, and explanation thereof will be omitted for brevity. The second embodiment shown in FIGS. 9 and 10 is different from the first embodiment shown in FIGS. 1 and 2 as follows. A pave of valve units 48 each of which is a combination of low pressure-loss valve 46 and the passage switching valve 47, are used for the first embodiment, while one passage switching valve 47 and a couple of low pressure-loss reed valves 46 are combined into a valve unit 58 in the second embodiment. In valve unit 58 of the second embodiment, valve housing 26 of passage valve 47 is inserted, as a unit, into the inner periphery of valve housing 46 of low pressure loss reed valve 46 as shown in FIG. 10. What is different from the first embodiment shown in FIG. 2 is that a wall 26a is formed on the inner surface of valve opening 29 of passage switching valve 47 to divide the inside of valve housing 26 into two sections. At the outer surface of valve housing 26, there are two through holes 59 and 60 formed to face each other and to communicate with valve opening 29. Valve openings 53 of a couple of low pressure-loss reed valves 46 are disposed on the outer surface of valve housing 26 of passage switching valve 47 so as to face the respective through holes 59 and 60. In the second embodiment, since the structure of the secondary air supplying system having motor-driven air pump 11 may be made simpler and lighter in weight the installation thereof may be made much easier.

Figure 3:
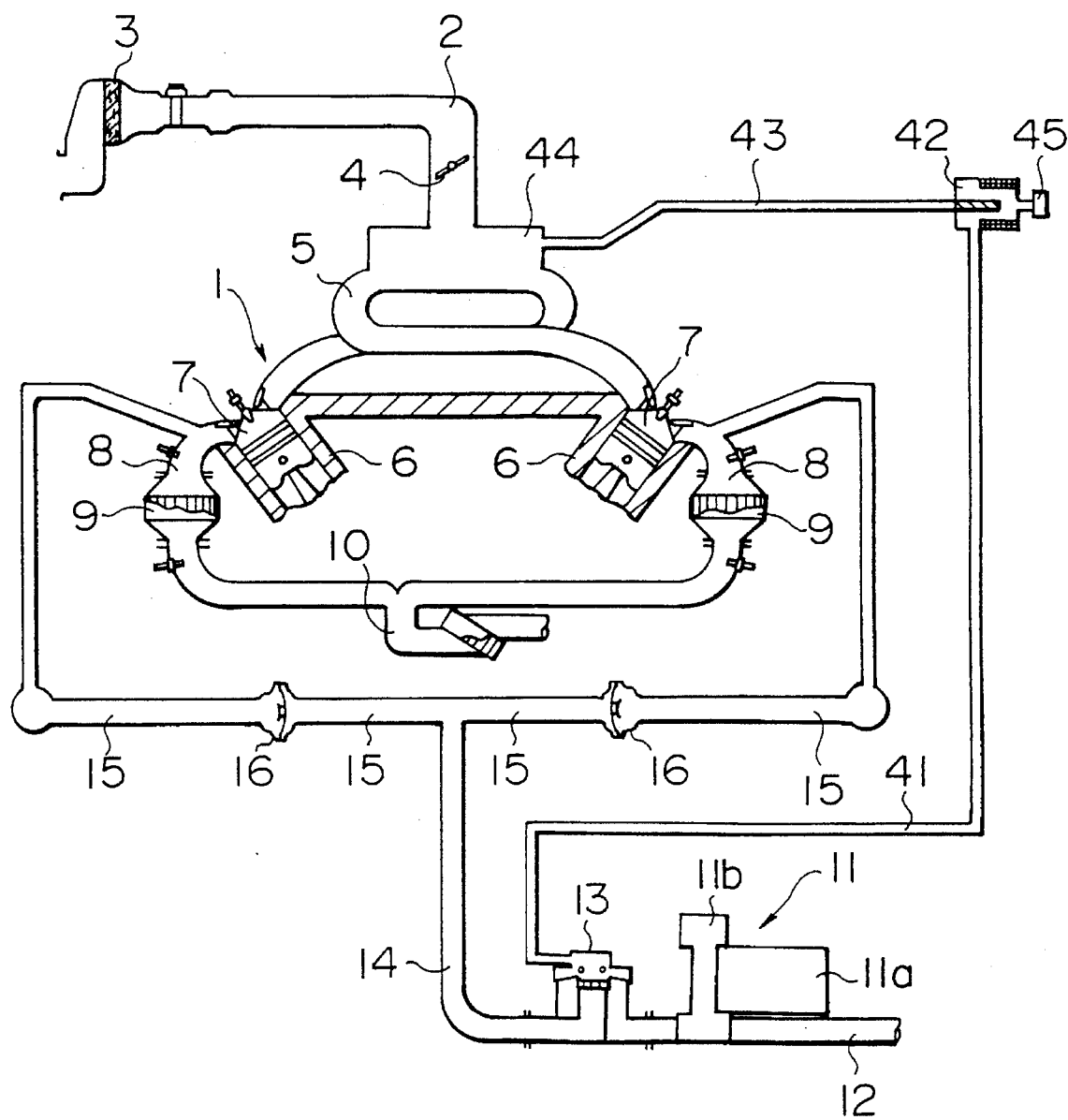
FIG. 3 is a cross-sectional view of a conventional motor-driven air pump system.
Figure 4:
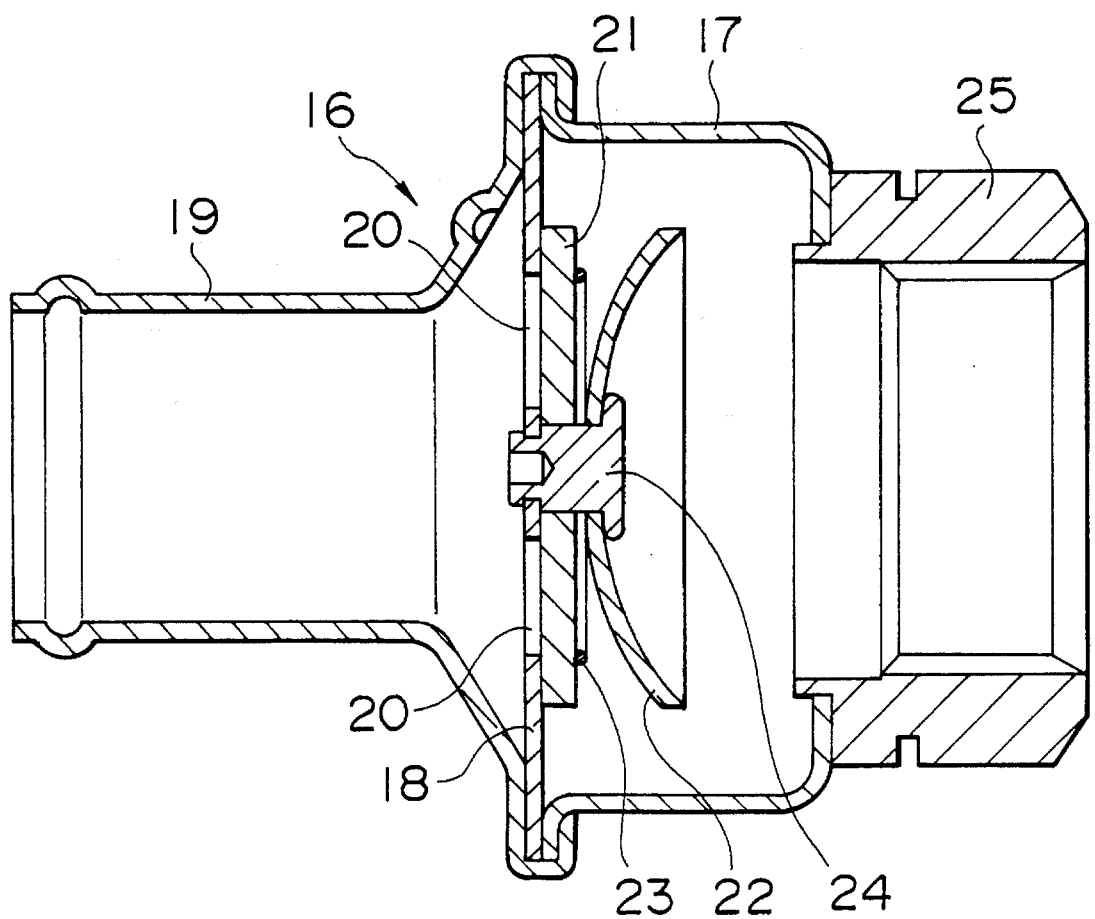
FIG. 4 is an enlarged cross sectional view of a check valve shown in FIG. 3.
Figure 5:
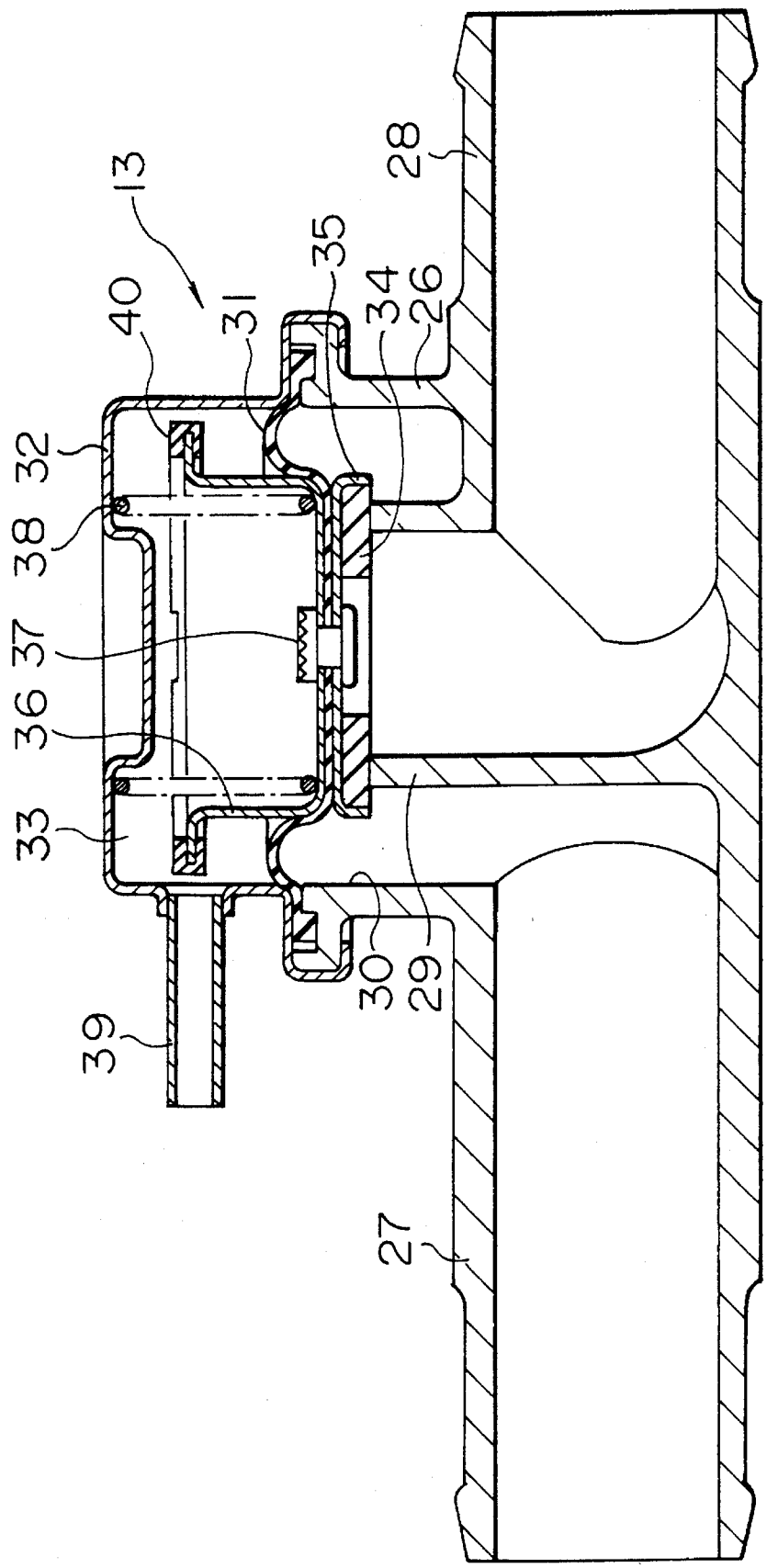
FIG. 5 is an enlarged cross sectional view of a passage switching valve part shown in FIG. 3.
Figure 11:
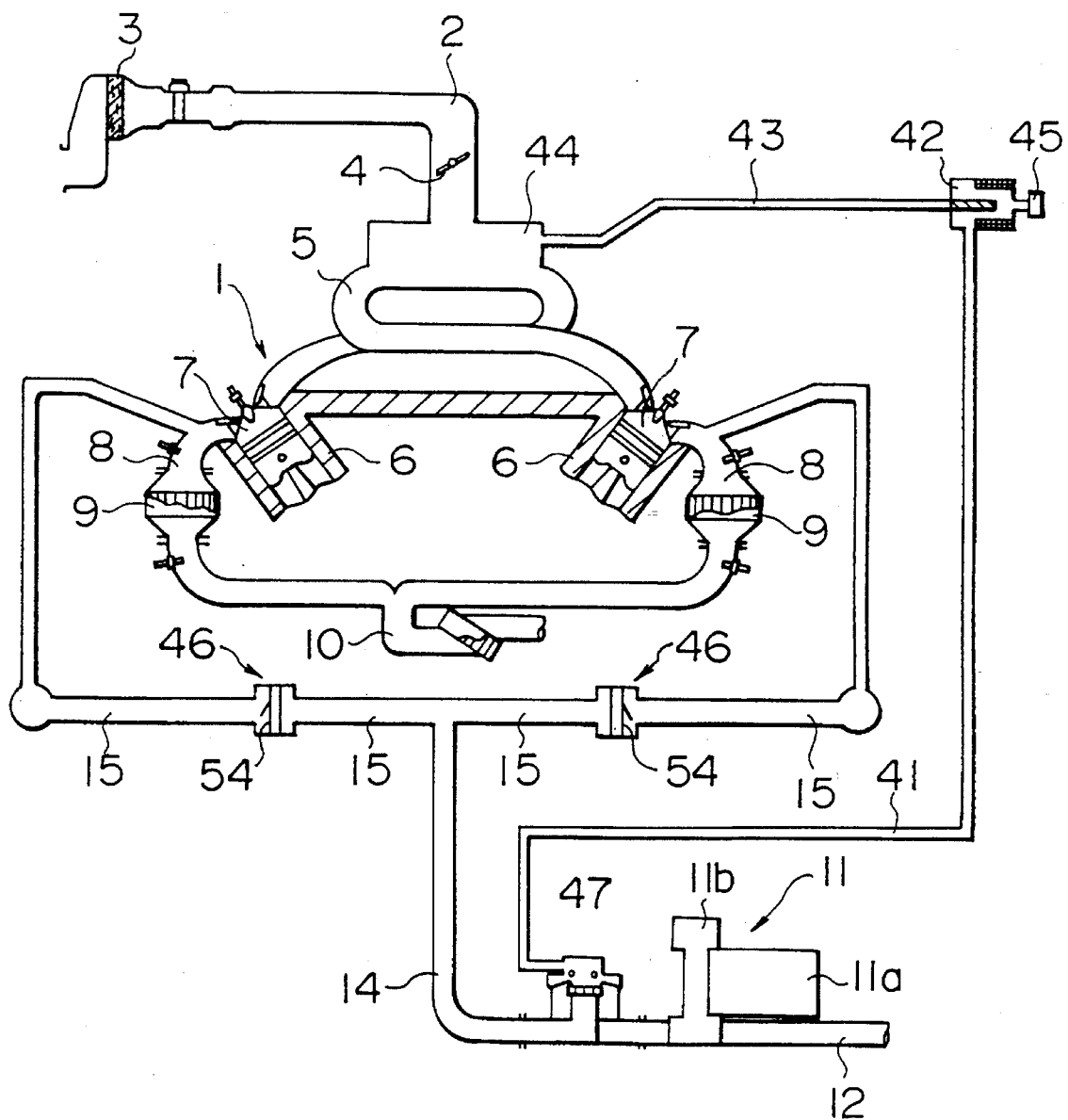
FIG. 11 is a cross-sectional view of a motor-driven air pump according to a third preferred embodiment of the present invention.

The third preferred embodiment of the motor-driven air pump system according to the, invention will be explained with reference to FIG. 11. The portions which are substantially same as in the first and second preferred embodiments explained above will have the same reference numerals and the explanation thereof be omitted. In the third embodiment, a conventional check valve 16 having rubber valve disk 21 shown in FIG. 3 is replaced by low pressure-loss reed valve 46 which uses a valve reed made of thin metal foil explained in the first embodiment.

According to the present invention, secondary air may be forcibly supplied to the exhaust gas by a motor-driven air pump to expedite warming-up of the engine when the engine is started, and also a suitable amount of secondary air may be supplied to the exhaust gas during the pulsation of the exhaust gas pressure without power assistance when the engine runs in frequent operating conditions such as deceleration, so that bad bad smell the catalyst may be prevented. Since the motor-driven air pump is not energized during ordinary operation, there is no need to make the motor-driven air pump bigger. Further, since the low pressure-loss reed valve is employed, no complicated control of the motor-driven air pump is necessary in order to provide a required discharge amount of the motor-driven air pump.

Further, since the passage switching valve and the low pressure-loss reed valve are combined to form a valve unit, the valve members may be made smaller. As a result, the whole system may be made more compact and the manufacturing cost thereof may be reduced, thereby providing a motor-driven air pump system which is easily installed. In addition, since the secondary air supply is provided not only in the engine starting period but also during the ordinary operation, problems such as corrosion or deposits caused by the exhaust gas or its condensate may be effectively prevented.

What is claimed is:

1. A secondary air supplying system comprising:
    an engine exhaust gas passage having a catalyst therein for purifying exhaust gas from an engine;
    a secondary air passage connected to a portion of said exhaust gas passage upstream of said catalyst;
    circulating means, including a motor-driven air pump, for forcibly supplying secondary air through said secondary air passage to said exhaust gas passage when the engine is starting to expedite warming-up of said catalyst, and for passively allowing the secondary air to pass therethrough after being warmed up when the engine runs and said motor-driven air pump is not energized; and
    a check valve, disposed at a position downstream from said air pump and having a reed member responsive to a pulsating change in exhaust gas pressure, for passing therethrough the secondary air.

2. A secondary air supplying system according to claim 1, wherein said circulating means comprises:
    a passage switching valve disposed in said secondary air passage and operatively connected to said check valve; and
    a control device for controlling said passage switching valve to open and close and for controlling energization of said motor-driven air pump according to an operating condition of the engine, thereby selectively supplying the secondary air to said catalyst.

3. A secondary air supplying system according to claim 2, wherein said control device comprises:
    a vacuum intake pipe with a first end thereof connected to an engine surge tank;
    a control pressure intake pipe with a first end thereof connected to said passage switching valve; and
    an electromagnetic vacuum switching valve having an atmosphere intake port and connected between a second end of said vacuum intake pipe and a second end of said pressure intake pipe, respectively, to selectively and exclusively introduce atmospheric pressure from said atmosphere intake port and vacuum pressure from said vacuum intake pipe to said control pressure pipe according to the engine operating condition.

4. A secondary air supplying system according to claim 2, wherein said passage switching valve and said check valve are integrally combined into a valve unit.

5. A secondary air supplying system according to claim 1, wherein said reed member of said check valve comprises:
    a sheet which flexibly responds to the pulsating change in exhaust gas pressure to introduce an amount of the secondary air to eliminate odors from said catalyzer.

6. A secondary air supplying system according to claim 5, wherein said sheet is a thin foil made of at least one of stainless steel and spring steel.

7. A secondary air supply system comprising:
    an engine exhaust gas passage having therein a catalyst for purifying engine exhaust gas from an engine;
    a secondary air passage, connected to a portion of said exhaust gas passage upstream from said catalyst, for introducing secondary air thereto;
    circulating means, including an air pump, for supplying compressed secondary air to said catalyst when the engine is starting to expedite warming-up of said catalyst and for passively passing therethrough the uncompressed secondary air as an air passage of low ventilation resistance when the engine runs after being warmed up and negative pressure exists in the exhaust gas passage; and
    a valve disposed at a position downstream of said air pump and having a reed member which follows substantially immediately a pulsation in exhaust gas pressure to supply the secondary air the catalyst to eliminate unburned exhaust gas causing odors when the engine runs after being warmed up and negative pressure exists in the exhaust gas passage.

8. A secondary air supplying system according to claim 1, wherein said system passes as little as 200 liters per minute of secondary air when a discharge pressure of said motor-driven air pump is less than 4 kP.

9. A secondary air supplying system according to claim 1, wherein said exhaust gas passage is disposed in a branched exhaust manifold, said check valve is connected to a first branch in said branched exhaust manifold, said system further comprising:
    at least one additional check valve, each of said at least one additional check valves being connected to a corresponding branch in said branched exhaust manifold, disposed at a position downstream from said air pump and having a reed member responsive to a pulsating change in exhaust gas pressure, for passing therethrough the secondary air.

10. A secondary air supplying system according to claim 1, wherein said exhaust gas passage is disposed in a branched exhaust manifold, said check valve is connected to a first branch in said branched exhaust manifold, said system further comprising:
    an additional check valve, said additional check valve being connected to a corresponding branch in said branched exhaust manifold, disposed at a position downstream from said air pump and having a reed member responsive to a pulsating change in exhaust gas pressure, for passing therethrough the secondary air;

a passage switching valve disposed in said secondary air passage and operatively connected to said check valve and said additional check valve; and a control device for controlling said passage switching valve to open and close and for controlling energization of said motor-driven air pump according to an operating condition of the engine, thereby selectively supplying the secondary air to said catalyst.

11. A secondary air supplying system according to claim 10, wherein said passage switching valve, said check valve and said additional check valve are integrally combined into a valve unit.

12. A secondary air supplying system according to claim 7, wherein said circulating means comprises:

a passage switching valve disposed in said secondary air passage and operatively connected to said check valve; and a control device for controlling said passage switching valve to open and close and for controlling energization of said motor-driven air pump according to an operating condition of the engine, thereby selectively supplying the secondary air to said catalyst.

13. A secondary air supplying system according to claim 12, wherein said control device comprises:

a vacuum intake pipe with a first end thereof connected to an engine surge tank;

a control pressure intake pipe with a first end thereof connected to said passage switching valve; and an electromagnetic vacuum switching valve having an atmosphere intake port and connected between a second end of said vacuum intake pipe and a second end of said pressure intake pipe, respectively, to selectively and exclusively introduce atmospheric pressure from said atmosphere intake port and vacuum pressure from said vacuum intake pipe to said control pressure pipe according to the engine operating condition.

14. A secondary air supplying system according to claim 12, wherein said passage switching valve and said check valve are integrally combined into a valve unit.

15. A secondary air supplying system according to claim 7, wherein said reed member of said check valve comprises:

a sheet which flexibly responds to the pulsating change in exhaust gas pressure to introduce an amount of the secondary air to eliminate odors from said catalyzer.

16. A secondary air supplying system according to claim 15, wherein said sheet is a thin foil made of at least one of stainless steel and spring steel.

17. A secondary air supplying system according to claim 7, wherein said exhaust gas passage is disposed in a branched exhaust manifold, said check valve is connected to a first branch in said branched exhaust manifold, said system further comprising:

at least one additional check valve, each of said at least one additional check valves being connected to a corresponding branch in said branched exhaust manifold, disposed at a position downstream from said air pump and having a reed member responsive to a pulsating change in exhaust gas pressure, for passing therethrough the secondary air.

18. A secondary air supplying system according to claim 7, wherein said exhaust gas passage is disposed in a branched exhaust manifold, said check valve is connected to a first branch in said branched exhaust manifold, said system further comprising:

an additional check valve, said additional check valve being connected to a corresponding branch in said branched exhaust manifold, disposed at a position downstream from said air pump and having a reed member responsive to a pulsating change in exhaust gas pressure, for passing therethrough the secondary air;

a passage switching valve disposed in said secondary air passage and operatively connected to said check valve and said additional check valve; and a control device for controlling said passage switching valve to open and close and for controlling energization of said motor-driven air pump according to an operating condition of the engine, thereby selectively supplying the secondary air to said catalyst.

19. A secondary air supplying system according to claim 18, wherein said passage switching valve, said check valve and said additional check valve are integrally combined into a valve unit.

* * * * *